(12) United States Patent
Mau et al.

(10) Patent No.: US 6,469,967 B1
(45) Date of Patent: Oct. 22, 2002

(54) METHODS FOR DETERMINING WRITE RATES OF OPTICAL MEDIA DEVICES

(75) Inventors: Yau-Ting Mau, Fremont; Robert McKeith, Milpitas, both of CA (US)

(73) Assignee: Roxio, Inc., Santa Clara, CA (US)

( * ) Notice: Subject to any disclaimer, the term of this patent is extended or adjusted under 35 U.S.C. 154(b) by 7 days.

(21) Appl. No.: 09/780,268

(22) Filed: Feb. 9, 2001

(51) Int. Cl.$^7$ .................................................. G11B 3/90
(52) U.S. Cl. .................... 369/53.3; 369/53.37
(58) Field of Search ........................... 369/44.27, 44.29, 369/44.35, 47.38, 47.39, 47.55, 53.3, 53.37, 53.43, 53.45

(56) References Cited

U.S. PATENT DOCUMENTS 5,265,081 A * 11/1993 Shimizume et al. ........ 369/53.3
5,878,009 A * 3/1999 Hayashi .................... 369/53.3

* cited by examiner

*Primary Examiner*—Paul W. Huber
(74) *Attorney, Agent, or Firm*—Martine & Penilla, LLP (57) ABSTRACT

Methods and computer readable media with program instructions for dynamically determining write speeds of an optical media device are provided. In one example, a method includes setting a device set write speed to a maximum write speed of the optical media device, and then verifying that the device set write speed is as just set. If the optical media device is verified to be as just set, a current set write speed is saved. The device set write speed is then decreased by an increment and the device set. The device set write speed is again verified to be as just set, and saved if verified. The method continues to decrease the device set write speed by an increment, set, verify, and save until the device set write speed is set to zero. Only verified set write speeds are presented as options for user interaction for the optical media device.

26 Claims, 4 Drawing Sheets

| Set Write Speed | Detected Write Speed | Saved Write Speed |
|---|---|---|
| 110 — 16x* | 16x | 16x |
| 112 — 14x** | 14x | 14x |
| 12x | -- | |
| 10x | 10x | 10x |
| 8x | -- | |
| 6x | 6x | 6x |
| 4x | -- | |
| 2x | 2x | 2x |
| 1x | 1x | 1x |

\* Detected CD Max Write Speed.
\*\* Current write speed setting of Optical Record Device.

| Set Write Speed | Detected Write Speed | Saved Write Speed |
|---|---|---|
| 110 — 16x* | 16x | 16x |
| 112 — 14x** | 14x | 14x |
| 12x | -- | |
| 10x | 10x | 10x |
| 8x | -- | |
| 6x | 6x | 6x |
| 4x | -- | |
| 2x | 2x | 2x |
| 1x | 1x | 1x |

\*   Detected CD Max Write Speed.
\*\*  Current write speed setting of Optical Record Device.

METHODS FOR DETERMINING WRITE RATES OF OPTICAL MEDIA DEVICES

BACKGROUND OF THE INVENTION

1. Field of the Invention

The present invention relates generally to the recording of data onto optical media, and more particularly to a method for determining actual recording speeds supported by an optical media recorder.

2. Description of the Related Art

When recording data to optical media, a user typically selects from a range of write speeds supported by the selected optical media recording device in accordance with the type and source of data to be recorded, the type of destination media, and the user's particular recording needs. By way of example, audio data may require extraction from one format of data, to be recorded to an audio compact disc (CD) suitable for playback on an audio system, or on a computer in a different audio data format. A user may desire to copy an entire CD of audio data or data files from one disc to another. A user may be selecting data from a plurality of sources including, for example, another CD, a system hard drive, a remote location by way of an Internet connection, and other such data sources. The user may be recording to CD-R media, or to CD-RW media. Systems, circumstances, and recording needs dictate a plurality of write speeds to provide optimum recording of data to optical media.

When recording data to optical media, a user typically uses a CD recording program to manage the functions of identifying and formatting the destination optical media, assembling and cataloging the selected files to record, reading the data from a source or sources, writing the data to the destination media, and other tasks of managing the recording of selected data to optical media. One of the tasks of recording data that the recording program typically manages is the writing of data to a destination optical media recorder at a selected recording or write speed. Optical media recorders are typically capable of recording at a plurality of speeds, and reading at a plurality of speeds as well. Individual user requirements, the type of destination media, and other such factors determine the optimum speed at which selected data should be written to an optical media, and the recording program typically presents to the user a range of supported speeds for a particular optical media recording device make and model as detected as the destination device.

Typically, in the prior art, the recording speeds presented to a user from which to select for a particular optical media recording device are hard coded into the CD recording software. During the manufacture of the CD recording software program, the specifications of various optical media recording devices are programmed into the software and include manufacturer, model, read and write speeds. When a user launches the program to record a CD, the program might detect the make and model of the destination optical media device, and then present to the user a range of write speeds supported by the make and model as programmed into the software. The manufacturers, models, and write speeds are therefore limited to what is known at the time of manufacture of the program. Additional recording devices and upgrades to existing devices are captured in subsequent upgrades to the software program, but the dynamic nature of hardware and software manufacture and distribution results in many devices absent from the programming code of the software application, and in some cases, incorrect information about the devices that have been subject to upgrade and change is contained in the recording software application.

One solution for the user to be able to use an unsupported or updated recording device is found in the firmware of the recording device itself. When a CD recording software program detects a recording device whose speeds are not contained in the programming code of the application, the software application reads the recording device code which provides the maximum recording speed of the particular device. As is known, peripheral devices such as optical media recording devices contain firmware that implements compatibility with a plurality of operating systems and application programs. A CD recording software application is generally able to identify a compatible optical media recording device, and determine the maximum record or write speed of that device. A significant limitation of this method of determining the write speed of the selected device is that only the maximum write speed of the device is identified. The maximum write speed is the maximum speed for the device itself, and not a maximum speed for a particular optical media. Further, the range of write speeds is not identified, and thus not provided to the user for selection by the CD recording software program.

Figure 1:
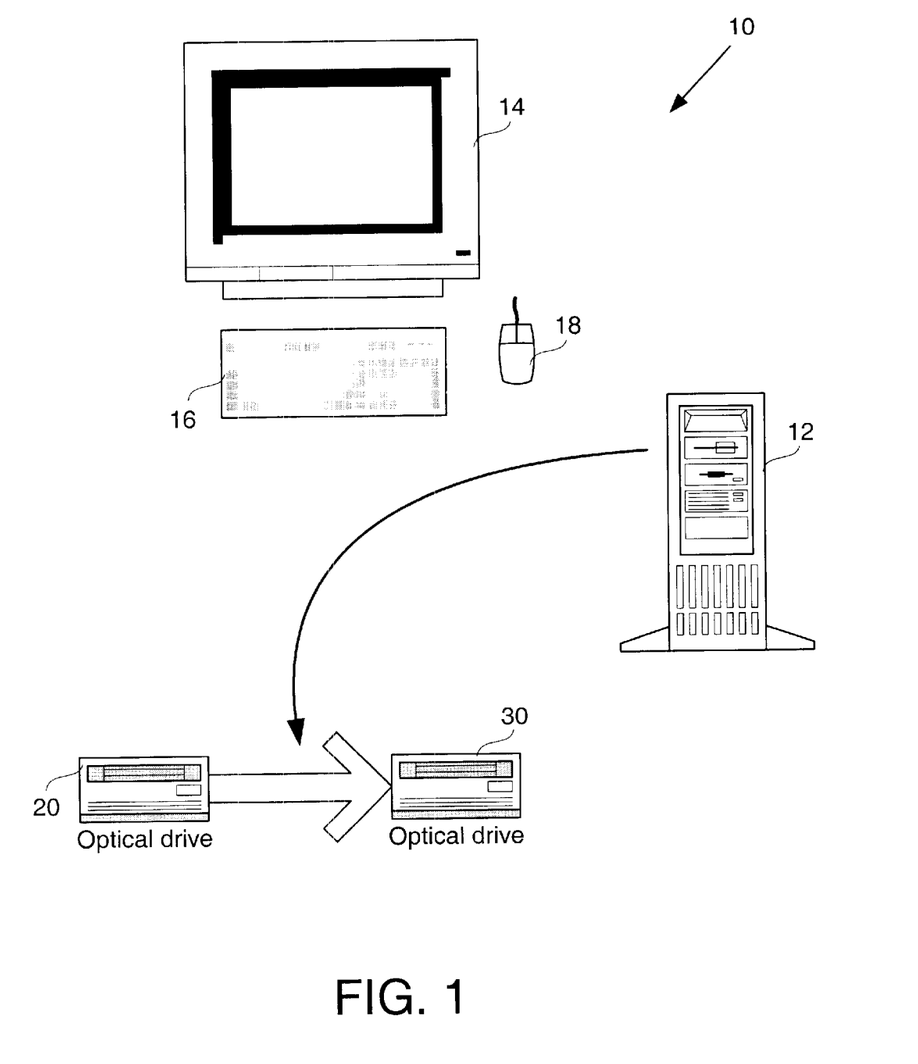
FIG. 1 illustrates a typical system configuration and an example of a situation in which a user would want to know more than just the maximum write speed of an optical media recording device.

FIG. 1 illustrates a typical system configuration and an example of a situation in which a user would want to know more than just the maximum write speed of an optical media recording device. FIG. 1 shows a typical user computer system 10 containing a PC tower case 12, a monitor 14, keyboard 16, and mouse 18. The PC tower case 12 can be of any configuration, but generally contains the PC processor, motherboard, a hard drive, and various supplemental or peripheral drives. The monitor 14 provides a graphical user interface for a user to, for example, navigate and operate a CD recording software program. The mouse 18 and keyboard 16 provide the user the ability to select, input, and manipulate data and commands in order to operate the program. In the illustrated example, a user may desire to record data from a source optical drive 20 to a destination optical drive 30, also known as a disc-to-disc copy procedure. In the illustrated example, the optimum recording of the destination optical media might not be at the destination device 30 maximum write speed. If, however, the destination optical media recording device 30 is not known to the CD recording software program, e.g., it was developed and manufactured after the release of the software program, the prior art method of writing to the unknown destination recording device 30 is typically at the speed coded in the destination recording device 30 firmware, which is the device maximum write speed.

If a user attempts to record data to optical media at other than the optimal write speed, numerous errors, failure of data transfer, or actual recording time exceeding expected recording time can all result. In the case where the user selects the maximum write speed of the selected device because the CD recording software has provided that speed as the only selection, errors or failure to record can result if the optical media used is other than that of the rated maximum write speed of the device. Further, if the capability of the recording device to write data to optical media exceeds the capability of the computer system recording engine to transfer data to buffer memory, then buffer under-run occurs. Buffer under-run also results in failure to record, and can destroy the destination optical media if it is not capable of being re-recorded.

In view of the foregoing, there is a need for a method for detecting the write speeds of an optical media recording device. The method should provide a CD recording software application and the user desiring to record data to optical media with the range of write speeds supported by a specific recording device selected as a destination drive in a CD recording operation. The method should be independent of the manufacture and release date of the recording device, and should be able to determine the range of write speeds of recording devices with or without application software updates.

SUMMARY OF THE INVENTION

Broadly speaking, the present invention fills these needs by providing a method for dynamically detecting the write speeds of an optical media device. The present invention can be implemented in numerous ways, including as a process, an apparatus, a system, a device, a method, or a computer readable media. Several inventive embodiments of the present invention are described below.

In one embodiment, a method for determining write speeds of an optical media device is disclosed. The method includes the setting of the optical media device to a maximum write speed as indicated by the device itself, and then verifying the optical media device accepted the setting and indicates to be set at the maximum write speed. The set write speed is then decreased by an increment and re-set, the optical media device verified to indicate the write speed as set, and the process repeated until the device set write speed reaches zero, having started at the maximum write speed and decreasing by an increment until the set write speed is zero. Each time the optical media device is verified to be as just set, the set write speed value is saved. The verified set write speeds are presented as options for user interaction for the optical media device.

In another embodiment, a computer implemented method for dynamically detecting write speeds of an optical media device is disclosed. The computer implemented method includes the setting of a device set write speed to a maximum write speed of the optical media device. The device is verified to be as just set, and the current set write speed of the device is saved if verified to be as just set. The device set write speed is decreased by an increment and re-set, and the computer implemented method repeats the setting, verifying, saving, and decreasing until the set write speed is set to zero. The verified set write speeds are presented as options for user interaction for the optical media device.

In still a further embodiment, a method for dynamically detecting write speeds of an optical media device is disclosed. The method includes the obtaining of a maximum write speed for the optical media device and sending a command to the optical media device to set the maximum write speed. The method next verifies the command was executed as sent, and then saves the maximum write speed to a data structure. The method then determines a next write speed and sends a command to the optical media device to set the next write speed. The command is verified to be executed as sent, and if verified, the next write speed is saved to the data structure. The determining of the next write speed, the sending the command to the optical media device to set the next write speed, the verifying of the command executed as sent, and the saving of the next write speed to the data structure are all repeated for a determined number of iterations. The saved next write speeds are provided for user interaction with the optical media device.

In yet another embodiment, computer readable media having program instructions for dynamically detecting write speeds of an optical media device is disclosed. The computer readable media includes program instructions for determining a maximum write speed of an optical media device, and for setting a set write speed to the maximum write speed of the optical media device. Program instructions are further provided for setting the optical media device to the set write speed and for verifying that an indicated write speed of the optical media device is as just set The set write speed is saved if the indicated write speed of the optical media device is verified to be as just set. The program instructions next provide for decreasing and setting the set write speed by an increment and then repeating the described process until the set write speed is set to zero. Only verified set write speeds are presented as options for user interaction for the optical media device.

The advantages of the present invention are numerous. One notable benefit and advantage of the invention is that all supported write speeds of a selected optical media recording device are presented to a user for selection in accordance with the user's particular recording circumstances or needs. As described above, the supported write speeds are determined for a particular optical media recording device at the time of program execution, if desired, obviating the need to expend time and resources to program device specifications from an ever expanding plurality of device manufacturers into a software application program during manufacture of the program or in constant production cycle updates. The user is reassured of the accuracy and reliability of the software application program as the supported write speeds are determined real-time and not dependent on software updates, or subject to the errors of later-released devices or device upgrades. The present invention provides a user with more control of the recording operation by determining the range of write speeds supported by a selected optical media device, and allowing the user to select from a range of speeds.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

Methods and computer readable media for determining the write speeds of optical media recording devices are disclosed. In preferred embodiments, the methods dynamically determine a range of write speeds supported by an optical media recording device, and then update the write speeds available for user selection every time a new recording device or recording media is selected. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

In one embodiment, the method of the present invention analyzes an optical media recording device to determine all speeds at which the device is capable of writing data. The range of speeds is then presented to a user desiring to select a particular write speed for recording optical media in accordance with the user's particular recording circumstances and needs. The method might be implemented in a program for recording optical media, in a file management program, or other such application in which an optical recording device is examined and utilized by a host computer system. Depending on the specific implementation of the present invention, the method might be initiated by the execution of a CD recording program, the booting of a system, the selection of a destination drive to which files have been selected to be written, the insertion of optical media into an optical media device, and other such events that commonly initiate the execution of programs, routines, sub-routines, and the like.

The present invention generally implements the examination of an optical media recording device, and the determination of the write speeds supported by the device. In one embodiment, a software program for the recording of CD media initiates an analysis of a destination optical recording device to determine the supported write speeds, and then to present the supported write speeds to the user to select the speed at which a recording operation will proceed. Upon initial examination or analysis of the destination device, the present invention determines and saves to a data structure the "current" or "prior" write speed which is that speed at which the device is set before any operation is performed in accordance with the present invention on the device to determine all supported write speeds. Once the method has been completed, in one embodiment, the device is returned to the current or prior write speed setting, and must be changed by deliberate action of the user if a different write speed is desired.

The present invention next provides for the determination of the recording device rated maximum write speed. This is typically the value coded into the device firmware as the device write speed, and is in fact the device maximum write speed. Once the current or prior write speed and the maximum write speed are determined, the present invention provides for the dynamic determination of the device write speeds by the systematic examination of the desired optical media recording device to determine all write speeds which are supported by the device.

In one embodiment, the destination optical media recording device is set to the maximum write speed as obtained from the device itself. The present invention provides for the setting and verification of write speeds of the destination device in accordance with known methods and practices of command, control, and interoperability of peripheral devices connected to a host computer system. In this manner, the destination device is set to the device maximum write speed.

Next, the device is interrogated to determine the indicated setting of the device. The detected write speed should equal the set write speed because, in the first instance of the claimed method, the set write speed is the maximum write speed as determined from the device itself. Therefore, the destination optical recording device should accept setting at the maximum rated write speed, and should respond when interrogated by indicating a setting at the maximum rated write speed.

As is known, the write speeds of optical media recorders generally begin at 1 or 1×, the real-time or true record speed, and then increment in even values to the maximum record or write speed. By way of example, a device might support a maximum write speed of 16×, with intermediate write speeds of 14×, 10×, 6×, and 2×, in addition to the real-time speed of 1×. In one embodiment of the present invention, a method for determining the write speeds of an optical media recording device begins with setting the device to the maximum write speed, and then successively decreasing the set write speed value by 2 to determine the various intermediate values of supported write speeds until the set write speed of 2× is reached. At that time, the set write value is decreased to 1×, the real-time record speed is verified as an available write speed, and the device is then returned to the state it was in prior to the determination of the range of supported write speeds.

Figure 2:
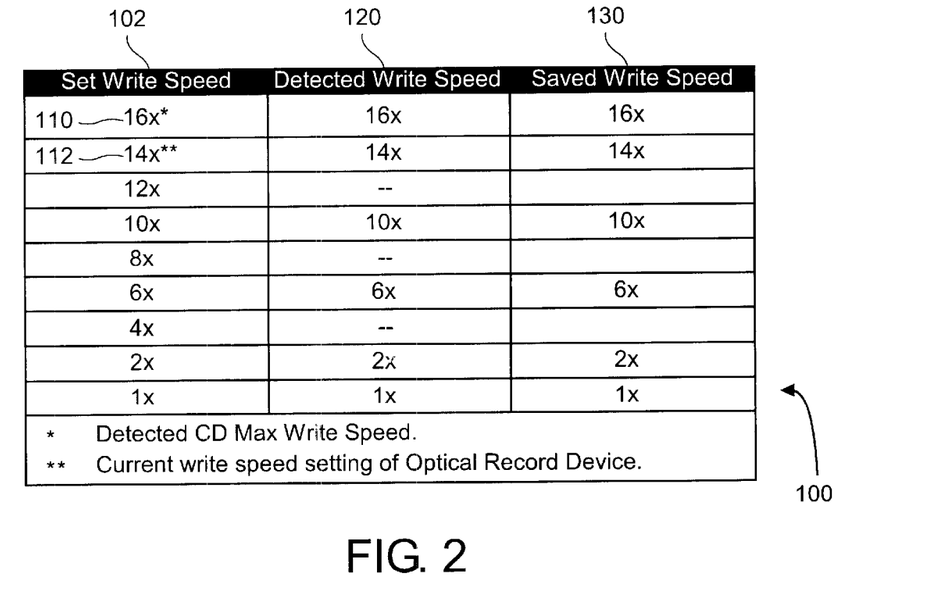
FIG. 2 is an example of a table of values associated with the determination of the write speeds of an optical media device in accordance with one embodiment of the present invention.

FIG. 2 is an example of a table of values 100 associated with the determination of the write speeds of an optical media device in accordance with one embodiment of the present invention. In the example illustrated in FIG. 2, the maximum write speed of the selected device is determined to be 16×, and 16× is the first value 110 in the Set Write Speed column 102. Prior to making any changes in the selected optical media recording device, the current or prior state, or the current or prior write speed, is determined and saved so that the device can be returned to that speed at the completion of the process of the present invention. In FIG. 2, the current or prior write speed is indicated with two asterisks (**) which correspond to a value of 14× in box 112.

The selected device maximum record speed is indicated in the first box 110 of the Set Write Speed column 102. In one embodiment of the present invention, the value in the Set Write Speed column 102 is then sent to the selected device. If the command sending the Set Write Speed value is accepted, as it should be for the maximum write speed, the selected optical recording device is then interrogated to determine the Detected Write Speed, or the write speed at which the selected device indicates it is set. The Detected Write Speed column 120 contains the values of the write speeds with which the selected optical media device responds to interrogation. In the case where the value in the Set Write Speed column 102 equals the value in the Detected Write Speed column 120, that value is saved as indicated in the Saved Write Speed column 130 of the table 100.

Once the maximum write speed is set, verified, and saved, the present invention, in one embodiment, decreases the value in the Set Write Speed column 102 by 2, and repeats the process of sending the set write speed to the selected optical media recording device, verifying the command was accepted, interrogating the selected optical media recording device for the write speed at which it is set, verifying the detected write speed equals the set write speed, and saving those write speed values in which the set and the detected values are equal. In FIG. 2, the next row of values following the device maximum write speed begins with a set write speed value of 14× in box 112, the detected write speed is also 14×, and so 14× is saved in the Saved Write Speed column 130. The next row begins with a set write speed value of 12× which represents a decrease in 2 from the previous value of 14×. No value is indicated in the Detected Write Speed column 120 in the row that begins with 12×. As described above, the command to set the value of the selected device write speed to 12× may have failed, or the device responded to the interrogation of write speed with an error, or any other such indication that the selected device failed to accept or set a write speed of 12×. Therefore, no value is saved in the Saved Write Speed column 130.

The table of values 100 indicates the range of possible write values for the example optical media device with a maximum write speed of 16×. In one embodiment, the present invention attempts to set the selected optical media recording device to each of the even-numbered values between the maximum write speed of 16× and the real-time write speed, 1×. Only those values corresponding to the condition in which the set write speed equals the detected write speed are saved. The values in the Saved Write Speed column 130 correspond to those write speeds that are supported by the selected optical media recording device and can be selected for use in a recording operation. In one embodiment, as each value is determined to be a supported write speed for the optical media device, e.g., 16×, 14×, 10×, 6×, 2×, and 1× in FIG. 2, the value is saved to a data structure. In one embodiment, the data structure is cumulative in that as the values are determined, they are added to the previously determined values and do not replace or delete the previously saved values. Once all of the supported write speeds have been determined for a particular device, the data structure contains a list of values that is sent, for example, to a CD recording program for user interaction to select from a range of supported write speeds.

Figure 3:
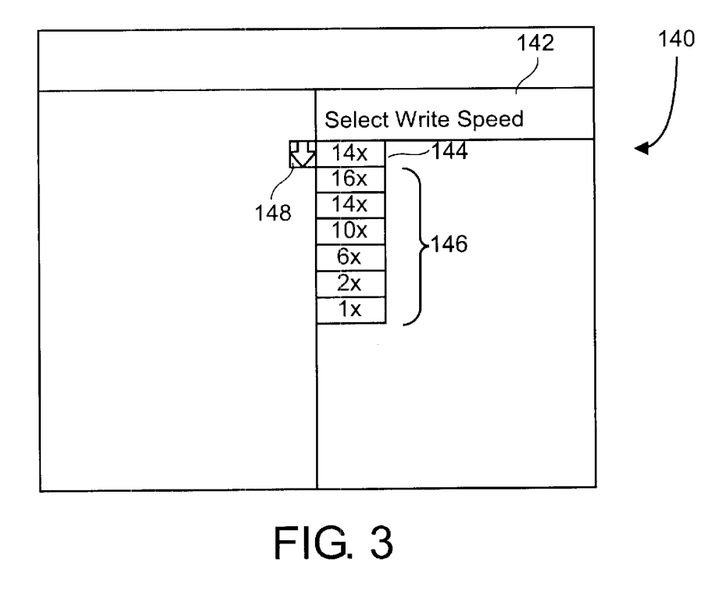
FIG. 3 illustrates an example graphical user interface of a portion of a CD recording application in which a user selects the write speed of the destination optical media recording device in accordance with one embodiment of the present invention.

FIG. 3 illustrates an example graphical user interface 140 of portion of a CD recording application in which a user selects the write speed of the destination optical media recording device in accordance with one embodiment of the present invention. A CD recording application might typically offer a plurality of selections for user input and verification in a graphical user interface 140, and FIG. 3 is intended to illustrate only one of a plurality of options and manners of displaying and requesting input for the desired write speed. The illustrated graphical user interface 140 shows a pull-down menu 148 for selecting the desired write speed. By way of example, the desired write speed might be selected using a pop-up menu, a selection box, radio button or any of a combination or permutation of typical selection techniques.

In the embodiment shown in FIG. 3, a user is prompted to select a write speed 142, and is presented with a selection pull-down menu 148. 14× is shown as the current value 144 as indicated above in reference to FIG. 2, and the available write speed selections 146 extend below the current value in typical pull down menu fashion. The illustrated write speed selections 146 correspond to the values in the Saved Write Speed column 130 of FIG. 2.

Figure 4:
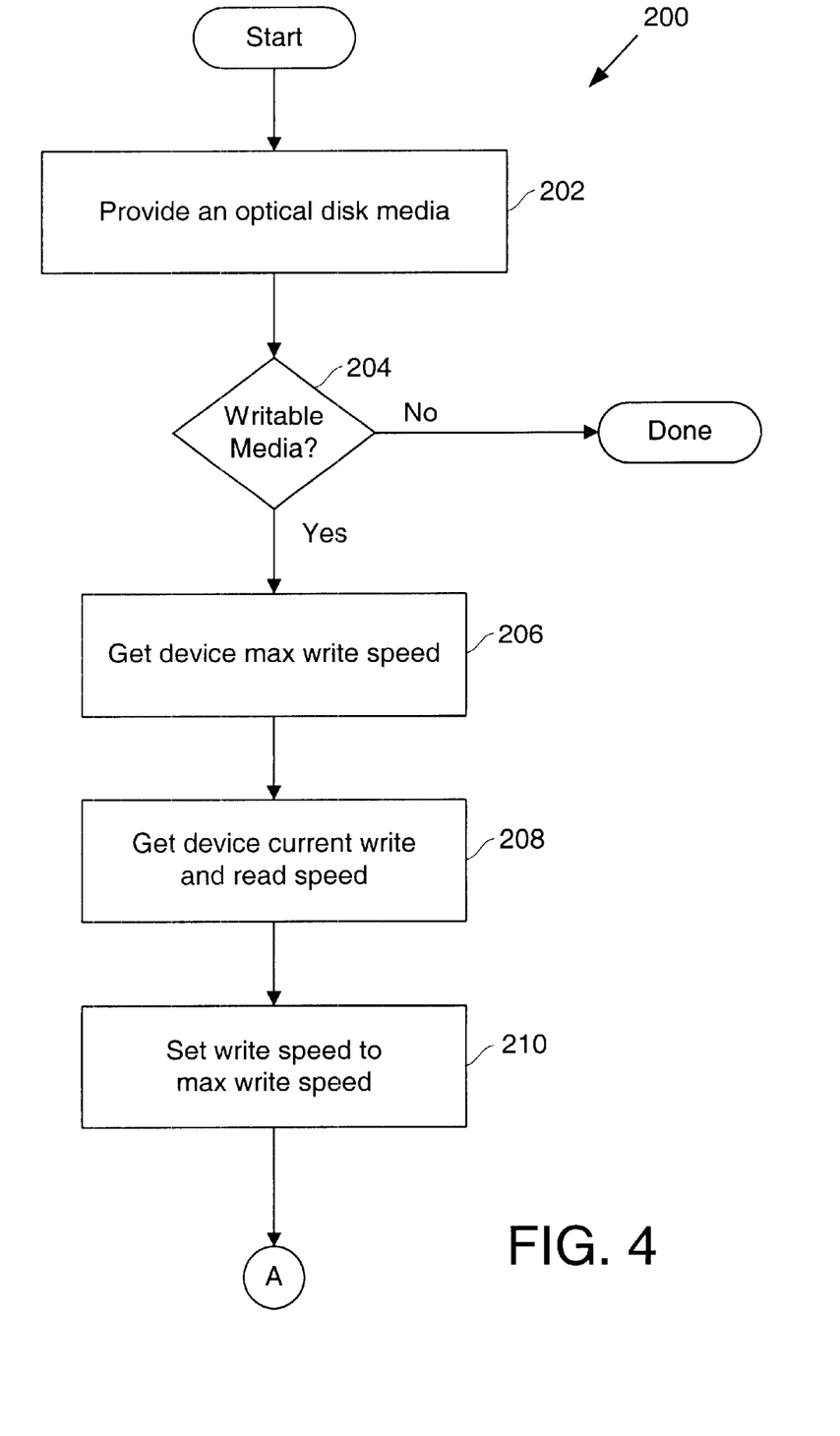
FIG. 4 shows a flowchart diagram illustrating the method operations performed in which the write speeds of a selected optical media recording device are determined in accordance with one embodiment of the present invention.

FIG. 4 shows a flowchart diagram 200 illustrating the method operations performed in which the write speeds of a selected optical media recording device are determined in accordance with one embodiment of the present invention. The method begins with operation 202 in which an optical disk media is provided. The media can be a CD-R or a CD-RW or any suitable optical media for writing data. The method, however, is concerned with the determination of optical media recording device write speeds, and so the media needs to be a writable media. In decision block 204, the method determines if the media in the selected drive is a writable media. If not, the method is done for that particular media as no determination of write speed need be made for media to which no data can be written. In another embodiment of the present invention (not illustrated), the method would determine whether the selected optical media drive had been previously examined to determine device write speeds. If the device had not been examined and no values were saved for the particular device, in one embodiment, the method would continue and determine supported write speeds even though no data might be written to the media currently inserted into the optical media device.

Assuming the method determined a writable media in decision block 204, the method advances to operation 206 and determines the maximum write speed of the selected optical media recording device. As is known, one of a plurality of parameters specified in a device firmware is the maximum write speed. In one embodiment of the present invention, the method obtains the device rated maximum write speed from the device itself. In operation 206, this maximum write speed is obtained. In one embodiment, a CD recording software program directs the obtaining of the maximum write speed from the device. In another embodiment, a CD recording software program or other program obtains the selected optical media recording device rated maximum write speed from a host computer operating system or component thereof.

The method next performs operation 208. In one embodiment, the current or prior write and read speeds of the selected optical media recording device are obtained in operation 208. Although the device read speed is of no relevance to the method of the present invention, it is a parameter commonly linked or contained in standard commands, such as those specified in MMC-1 (Multi Media Command-1, proposed standard). Other standard commands and conventions may be obtained from the MMC-1 standard, Revision 10A, 1997, which is hereby incorporated by reference. Once the device current or prior write and read speeds are obtained, they are saved so that the selected device can be re-set to the state in which it existed prior to the method of the present invention. In another embodiment, the current write speed of the device is obtained and saved.

The method next advances to operation 210 in which the set write speed is set to the maximum write speed of the device as obtained in operation 206. The set write speed, as described above in reference to FIG. 2, is the speed to which the optical media recording device will be set to determine if the device supports the particular speed. The first speed to which the device will be set is the device maximum rated write speed, and in operation 210, the set write speed is set to the maximum write speed. The method then continues through connector "A" to FIG. 5.

Figure 5:
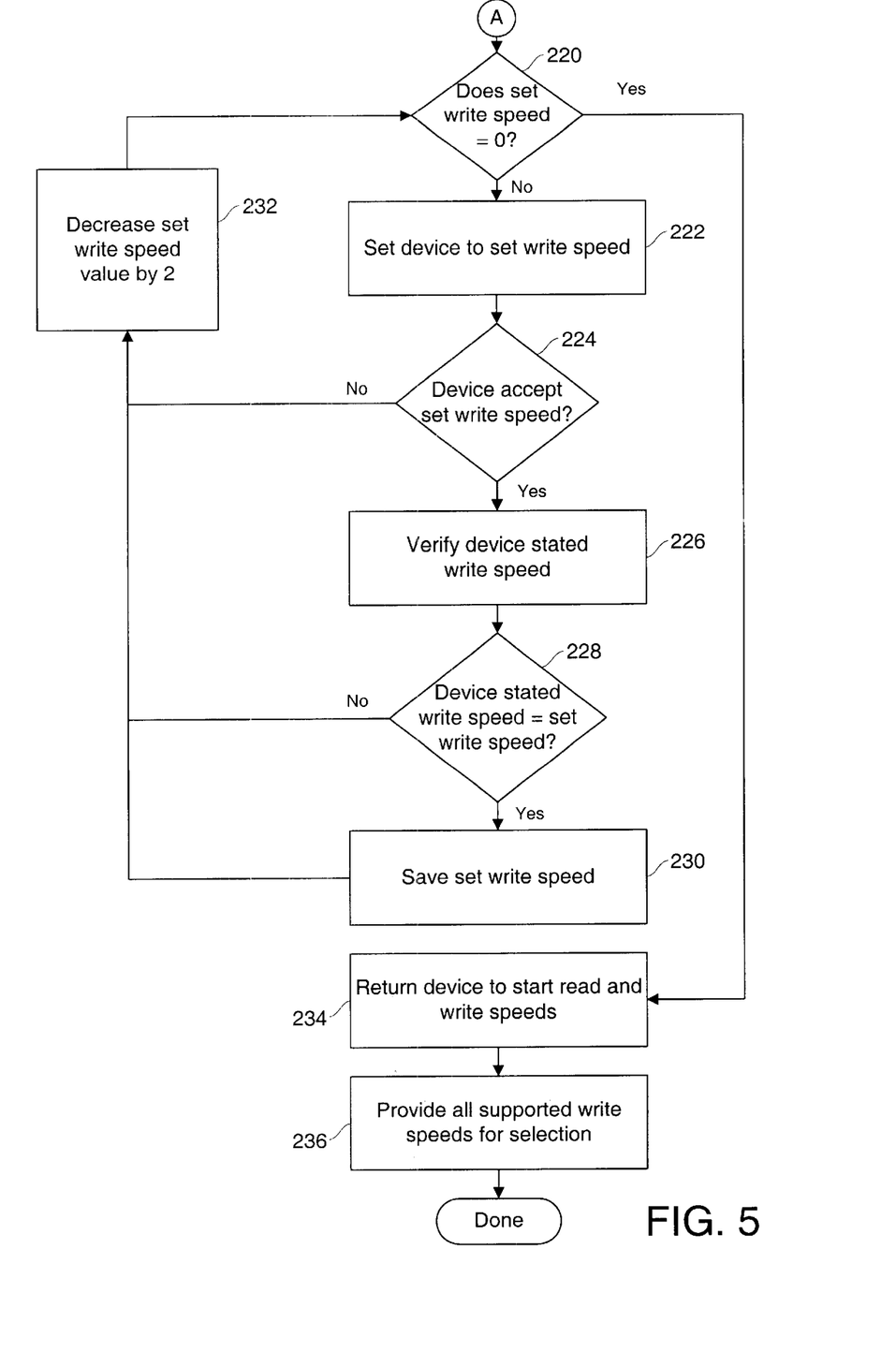
FIG. 5 is a continuation of the flowchart diagram illustrating the method operations performed in which the write speeds of a selected optical media recording device are determined in accordance with one embodiment of the present invention.

FIG. 5 is a continuation of the flowchart diagram 200 illustrating the method operations performed in which the write speeds of a selected optical media recording device are determined in accordance with one embodiment of the present invention. Connector "A" enters the flowchart diagram 200 at decision block 220. Decision block 220 represents an exit route for the method of determining the supported write speeds of a selected optical media recording device. When the set write speed equals zero, the method will conclude as described in detail below. In decision block 220, the method determines if the set write speed equals zero. If so, then the method proceeds to operation 234 to conclude. By entering FIG. 5 through connector "A", the set write speed is equal to the device maximum write speed, set in operation 210. Assuming that value does not equal zero, the method advances to operation 222.

In operation 222, the method sets the device to the set write speed. In one embodiment, the actual command to set the device to the set write speed is sent in operation 222. In flowchart diagram 200, operation 210 (see FIG. 4) is analogous to entering the value into the Set Write Speed column 102 of FIG. 2. Once the value is entered into the table (FIG. 2), or once the value has been set as the set write speed (operation 210, FIG. 4), the command is sent to the device to set the write speed to the set write speed in operation 222 of FIG. 5.

The method proceeds through decision block 224 in which the sending of the command in operation 222 is evaluated as successful. If the command is successful, the method advances to operation 226. If however, the command fails, the method proceeds to operation 232 and decreases the write speed value by 2, in one embodiment. Operation 232 is discussed in greater detail below. A "No" to decision block 224 can be obtained in a plurality of ways. By way of example, the sending of the command to the device to set to a specific speed could generate an immediate failure or error if the device does not support the write speed sent, and immediately communicate the error or failure to the sending program. Any error or failure to set the set write speed, in one embodiment, indicates the selected device does not support the write speed sent, and the method proceeds through operation 232 to set another write speed.

In operation 232, the method decreases the set write speed value by 2. By way of example, if the set write speed is 14×, the method sends the command to set the device to 14× in operation 222. If the device fails to accept the 14× command, or immediately returns an error (a "No" to decision block 224), the method decreases the write speed by 2 and enters the next set write speed as 12×. As described above in reference to FIG. 2, the failure of the device to accept the set write speed, or the return of an error, indicates the set write speed cannot equal the detected write speed as there can be no detected write speed. The set write speed is decreased by 2 which would be analogous to entering a next row of the table in FIG. 2, and no write speed value is saved. The error or failure indicates the device does not support, or will not write, at the set write speed that was sent. The increment of 2 is illustrated as the most common example, but other embodiments might use a different increment. The function of operation 232 is to decrease the set write speed by a specified increment, and in one embodiment, the increment is 2.

If, in operation 224 of FIG. 5, the device accepted the set write speed, the method continues with operation 226 and verifies the device stated write speed. In one embodiment, the method interrogates the selected optical media recording device to determine at what write speed the device is actually set. As described in reference to FIG. 2 above, the stated write speed is analogous to the detected write speed.

The method then continues with decision block 228 in which the method determines whether the set write speed, or the write speed sent to the device in operation 222, is equal to the device stated write speed, or the write speed at which the device indicates it is set in response to the interrogation in operation 226. If the stated write speed does not equal the set write speed, a "No" to decision block 228, then the method loops back through operation 232 to try the next set write speed. No write speed value is saved, and the device does not support that particular write speed. If the stated write speed does equal the set write speed, a "Yes" to decision block 228, then the method advances to operation 230 in which that write speed value is saved. The saved write speed values are analogous to the saved write speed values shown in FIG. 2, and are saved to a data structure.

If the method proceeds through operation 230 and saves a set write speed, then the method loops back through operation 232 where the set write speed value is decreased by 2, and proceeds through decision block 220 in which the set write speed is evaluated to determine if it is equal to 0. In this manner, each even value between the device maximum write speed and 2× is evaluated to determine if the selected optical media recording device supports the particular write speed. Each supported write speed is saved in operation 230.

As can be appreciated, when the saved value is equal to 2×, it would decrease by 2 in operation 232, and the result in decision block 220 would be "Yes". If the result in decision block 220 is "Yes", the method proceeds to operation 234 in which the method returns the device to the prior read and write speeds determined in operation 208 (FIG. 4). Once the device has been returned to its original state in operation 234, the method proceeds to operation 236 in which all of the write speeds supported by the selected optical recording device as determined by the preceding method operations and saved to a data structure, are provided for user interaction. The interaction can be by selection using a pull-down menu, a pop-up menu, a selection box, radio buttons, or other such manner of selection. Most commonly, the interaction would be provided in the context of an optical media recording software application, and the user would be provided the option to set the destination device write speed. In accordance with the method operations as described herein, the write speeds available for selection are the range of speeds that have been determined to be supported by the selected optical media recording device. Once the supported write speeds have been provided in operation 236, the method is done.

In another embodiment of the above described method operations, an additional operation is performed to validate the selected optical media recording device real-time record speed capability. In such an embodiment, the method as described above in reference to FIG. 5 includes an additional decision block following operation 232 and prior to decision block 220. The additional decision block determines whether the set write speed is equal to 2×. If the set write speed does not equal 2×, the method continues with decision block 220 as previously described. If the set write speed does equal 2×, then the set write speed is set to 1× and then evaluated through the method operations as described. When advancing through the loop, an additional determination of whether the set write speed is equal to 1× so that it can be set to 0 is also included to ensure the exit out of the loop.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining write speeds of an optical media device, comprising:
   (a) setting a device set write speed to a maximum write speed of the optical media device;
   (b) verifying that the device set write speed is as just set;
   (c) saving a current set write speed if the optical media device is verified to be as just set;
   (d) decreasing and setting the device set write speed by an increment; and
   (e) repeating (b)–(d) until the device set write speed is set to zero;
      whereby, only verified set write speeds are presented as options for user interaction for the optical media device.

2. A method for determining write speeds of an optical media device as recited in claim 1, further comprising:
   determining and saving a prior write speed setting of the optical media device prior to the setting the device set write speed to the maximum write speed of the optical media device; and
   setting the optical media device to the saved prior write speed setting after the repeating (b)–(d) until the device set write speed is set to zero.

3. A method for determining write speeds of an optical media device as recited in claim 2, wherein the maximum write speed of the optical media device is obtained from the optical media device.

4. A method for determining write speeds of an optical media device as recited in claim 2, wherein the saving the current set write speed is to a data structure which is populated with all verified set write speeds for a particular optical media device.

5. A method for determining write speeds of an optical media device as recited in claim 2, wherein the increment by which the device set write speed is decreased and set is 2x.

6. A method for determining write speeds of an optical media device as recited in claim 4, wherein the options for user interaction include an option to set the optical media device to a write speed for a recording operation, the write speed being one of the verified set write speeds for a particular optical media device.

7. A method for determining write speeds of an optical media device as recited in claim 1, wherein the method is initiated by one of booting the computer, executing an optical media recording program, inserting a disc into an optical media device, and executing a command to update system parameters.

8. A computer implemented method for dynamically detecting write speeds of an optical media device, comprising:
   (a) setting a device set write speed to a maximum write speed of the optical media device;
   (b) verifying that the device set write speed is as just set;
   (c) saving a current set write speed if the optical media device is verified to be as just set;
   (d) decreasing and setting the device set write speed by an increment; and
   (e) repeating (b)–(d) until the device set write speed is set to zero;
      whereby, only verified set write speeds are presented as options for user interaction for the optical media device.

9. A computer implemented method for dynamically detecting write speeds of an optical media device as recited in claim 8, further comprising:
   determining and saving a prior write speed setting of the optical media device prior to the setting the device set write speed to the maximum write speed of the optical media device; and
   setting the optical media device to the saved prior write speed setting after the repeating (b)–(d) until the device set write speed is set to zero.

10. A computer implemented method for dynamically detecting write speeds of an optical media device as recited in claim 9, wherein the maximum write speed of the optical media device is obtained from the optical media device.

11. A computer implemented method for dynamically detecting write speeds of an optical media device as recited in claim 9, wherein the saving the current set write speed is to a data structure which is populated with all verified set write speeds for a particular optical media device.

12. A computer implemented method for dynamically detecting write speeds of an optical media device as recited in claim 9, wherein the increment by which the device set write speed is decreased and set is 2x.

13. A computer implemented method for dynamically detecting write speeds of an optical media device as recited in claim 11, wherein the options for user interaction include an option to set the optical media device to a write speed for a recording operation, the write speed being one of the verified set write speeds for a particular optical media device.

14. A computer implemented method for dynamically detecting write speeds of an optical media device as recited in claim 8, wherein the method is initiated by one of booting the computer, executing an optical media recording program, inserting a disc into an optical media device, and executing a command to update system parameters.

15. A method for dynamically detecting write speeds of an optical media device, comprising:
   obtaining a maximum write speed for the optical media device;
   sending a command to the optical media device to set the maximum write speed;

verifying the command executed as sent;

saving the maximum write speed to a data structure;

determining a next write speed;

sending a command to the optical media device to set the next write speed;

verifying the command executed as sent;

saving the next write speed to a data structure if the command executed as sent;

repeating the determining the next write speed, the sending the command to the optical media device to set the next write speed, the verifying the command executed as sent, and the saving the next write speed to the data structure if the command executed as sent, for a determined number of iterations; and providing the next write speeds saved to the data structure for user interaction with the optical media device.

16. A method for dynamically detecting write speeds of an optical media device as recited in claim 15, wherein the maximum write speed is obtained from the optical media device.

17. A method for dynamically detecting write speeds of an optical media device as recited in claim 15, wherein the determining of the next write speed includes a successive decreasing by an increment of a write speed sent to the optical media device until the next write speed equals 2×.

18. A method for dynamically detecting write speeds of an optical media device as recited in claim 17, further comprising:

setting the next write speed to 1× for an iteration following the iteration in which the next write speed equals 2×; and executing the interation in which the next write speed equals 1×.

19. A method for dynamically detecting write speeds of an optical media device as recited in claim 15, wherein the verifying the command executed as sent includes a determination of no errors received from the optical media device and an ensuring the optical media device is set to the next write speed.

20. A method for determining supported recording write speeds of an optical media device, comprising:

(a) determining a device maximum write speed of the optical media device;

(b) determining a current read and write speed of the optical media device;

(c) saving the current read and write speeds of the optical media device;

(d) setting the optical media device to the device maximum write speed;

(e) verifying the device accepted and is set at the device maximum write speed;

(f) saving the device maximum write speed to a data structure;

(g) determining a next set write speed at a value which is an increment less than the device maximum write speed;

(h) setting the optical media device to the next set write speed;

(i) verifying the optical media device accepted and is set at the next set write speed;

(j) saving the next set write speed to the data structure if the optical media device accepted and is set at the next set write speed;

(k) decreasing the next set write speed by the increment;

(l) repeating (h) through (k) until the next set write speed equals 2×;

(m) repeating (h) through (j) for a next set write speed of 2×;

(n) setting the next set write speed to 1×;

(o) repeating (h) through (j) for a next set write speed of 1×;

(p) setting the optical media device to the read and write speeds saved in (c); and (q) providing the saved device maximum write speed and saved next set write speeds in the data structure as supported write speeds of the optical media device.

21. A method for determining supported recording write speeds of an optical media device as recited in claim 20, wherein the device maximum write speed is obtained from the optical media device.

22. A method for determining supported recording write speeds of an optical media device as recited in claim 20, wherein the increment is 2×.

23. Computer readable media having program instructions for dynamically detecting write speeds of an optical media device, comprising:

(a) program instructions for determining a maximum write speed of an optical media device;

(b) program instructions for setting a set write speed to the maximum write speed of the optical media device;

(c) program instructions for setting the optical media device to the set write speed;

(d) program instructions for verifying that an indicated write speed of the optical media device is as just set;

(e) program instructions for saving the set write speed if the indicated write speed of the optical media device is verified to be as just set;

(f) program instructions for decreasing and setting the set write speed by an increment; and (g) program instructions for repeating (c)–(f) until the set write speed is set to zero;

whereby, only verified set write speeds are presented as options for user interaction for the optical media device.

24. Computer readable media having program instructions for dynamically detecting write speeds of an optical media device as recited in claim 23, wherein the maximum write speed of the optical media device is obtained from the optical media device.

25. Computer readable media having program instructions for dynamically detecting write speeds of an optical media device as recited in claim 24, wherein the increment is 2×.

26. Computer readable media having program instructions for dynamically detecting write speeds of an optical media device as recited in claim 23, wherein the indicated write speed is a write speed at which the optical media drive indicates it is set.

* * * * *